United States Patent [19]

Schatz

[11] 4,001,550
[45] Jan. 4, 1977

[54] UNIVERSAL FUNDS TRANSFER AND IDENTIFICATION CARD

[76] Inventor: Vernon L. Schatz, 250 Sunset Ridge Road, Northfield, Ill. 60093

[22] Filed: Dec. 4, 1975

[21] Appl. No.: 637,712

[52] U.S. Cl. .................. 235/61.7 B; 235/61.12 N; 340/174 M
[51] Int. Cl.² .................. G06K 5/00; G06K 19/06; G11C 11/02
[58] Field of Search ............... 235/61.7 R, 61.7 B, 235/61.12 N, 61.12 C; 340/149 R, 149 A, 152 R, 174 M

[56] References Cited
UNITED STATES PATENTS

| | | | |
|---|---|---|---|
| 3,142,823 | 7/1964 | Lewin et al. | 235/61.12 C |
| 3,559,175 | 1/1971 | Pomeroy | 340/152 R |
| 3,637,994 | 1/1972 | Ellingboe | 235/61.12 N |
| 3,868,057 | 2/1975 | Chavez | 235/61.7 B |
| 3,876,865 | 4/1975 | Bliss | 235/61.12 C |
| 3,934,122 | 1/1976 | Riccitelli | 235/61.12 N |

*Primary Examiner*—Daryl W. Cook
*Attorney, Agent, or Firm*—Leydig, Voit, Osann, Mayer & Holt

[57] ABSTRACT

A universal funds transfer and identification card for use with electronic terminals, such card including a random access memory for storing up to date account information sufficient to allow the completion of at least certain transactions without the intervention of a remote computer. The card includes a plurality of storage fields, selectively addressable for storing changeable information including account balance, total amount of transactions since last update of balance, and date of last update. The information necessary for authorizing and completing a transaction is addressed by a universal terminal for transfer to the terminal from the card. The terminal is adapted to determine the credit status of the account from the information contained on the card, perform the transaction if allowed, and update the information on the card so that the card is, itself, a record of the type and status of the account.

13 Claims, 1 Drawing Figure

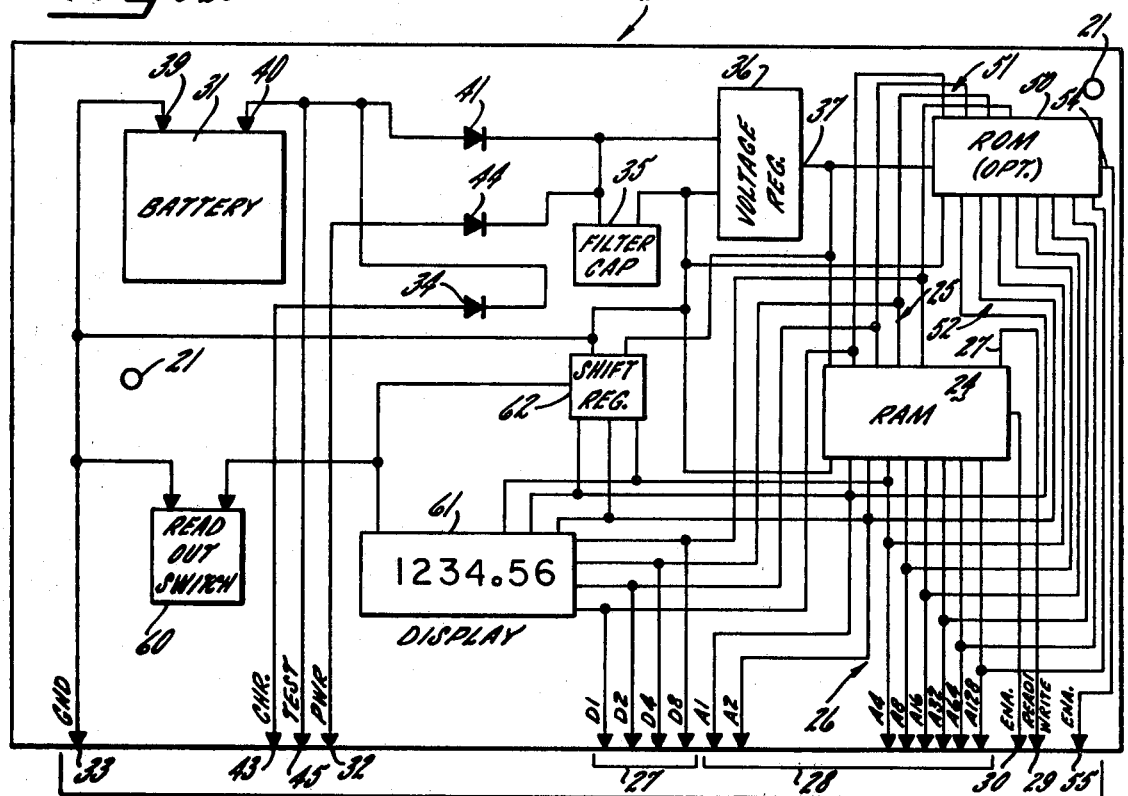
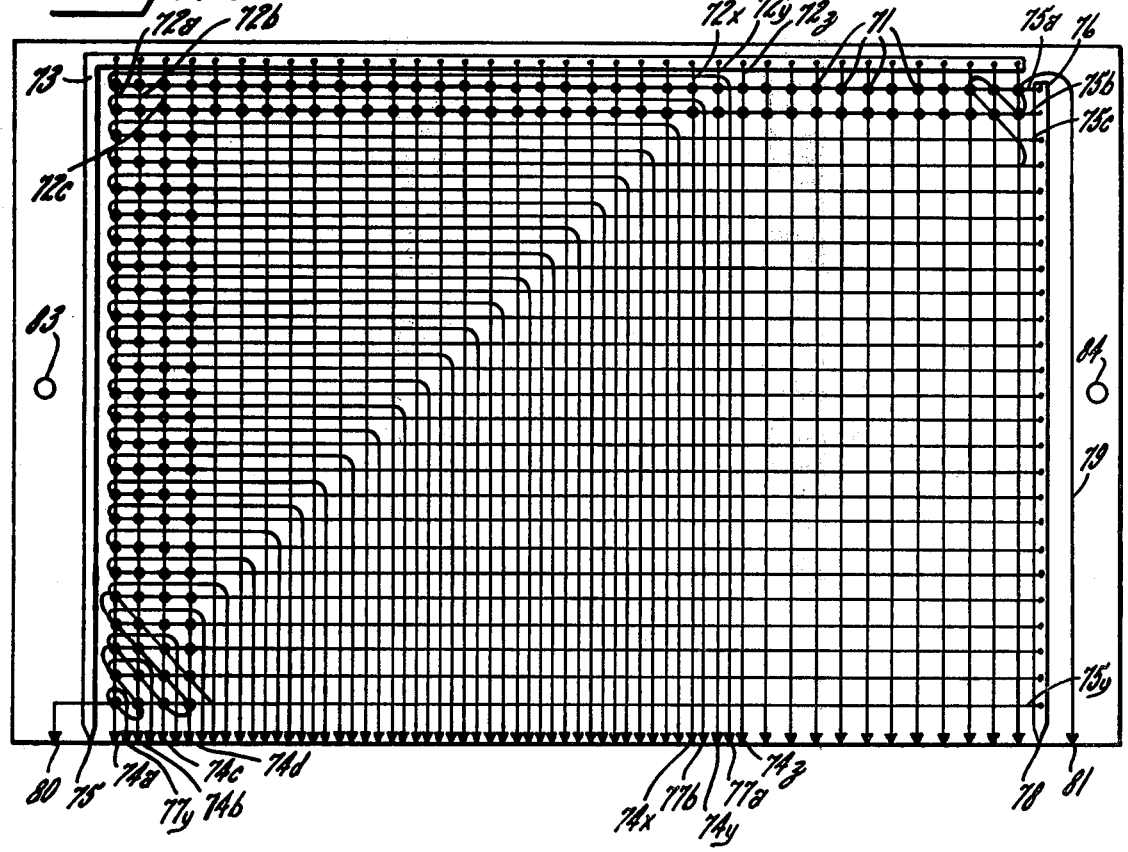

UNIVERSAL FUNDS TRANSFER AND IDENTIFICATION CARD

This invention relates to machine readable information bearing cards, and more particularly to such cards having the capability of storing changeable information.

Such cards find particular application in Electronic Funds Transfer Systems, for example, as a consumer held key for entry into the burgeoning credit network, as well as in security and reservations systems.

It is desirable in a credit system to allow transactions at numerous dispersed locations, with the results of the transaction being fed to a central location, for accounting, billing and the like. Typically, up to date account information is available only at the central location. Except in cases where the size of the transaction is small enough to justify the risk, communication with the central station is necessary when performing a transaction in order to assure that the transaction should be performed. For example, it may be necessary to assure that the credit card presented for the transaction is valid, that the card is current, that it has not been stolen, that the account balance is sufficient to cover the transaction, and that the type of transaction is allowed. For these and other reasons, the credit systems which have developed generally depend upon accessing a computer data base in real time (during the actual transaction) or capturing data under specific procedural rules for subsequent transmission to update a central data base. As a result, the communications costs of the typical credit system are quite high.

It has also been suggested to record a limited amount of changeable information on a credit card and to update that information via a transaction terminal so that the card bears an up to date account balance. U.S. Pat. No. 3,559,175 to Pomeroy discloses a credit card system using a card having a line of magnetic cores which mate projecting pins in a dedicated terminal so that the terminal may read an account balance from the cores, perform the transaction and write the new account balance into the cores. That system suffers from the shortcoming of limited flexibility, the account balance, only one of the elements of account status, being the only up to date changeable information on the card. In short, the card is not truly universal in character. Further, because the single elements of changeable data are directly accessible from without the card, as opposed to storing data in a memory within the card in fields selectively addressable from without, that card suffers from a potential security problem.

With the foregoing in mind, it is a general aim of the present invention to provide a universal funds transfer and identification card, for storing a plurality of elements of changeable data, so that the card is, itself, an up to date record of the type and status of the account which it represents.

In accomplishing that aim, it is an object of the present invention to provide a universal funds transfer and identification card having a plurality of fields of changeable information, selectively addressable, so that the information in selected fields may be read by a terminal for obtaining from the card information necessary for completing a transaction, and may be written into by the terminal for updating the account status. An even more detailed object is to provide such a card having a random access memory, the memory being divided into fields, with the fields selectively addressable for reading or writing by a terminal.

A related object is to provide such a card having a high degree of security from unauthorized tampering.

According to another aspect of the invention, an object is to provide a card of the foregoing type which is convenient to carry and to use, by localizing the connecting points for mating the terminal along a single edge of the card.

Other objects and advantages will become apparent from the following detailed description, when taken in conjunction with the drawings, in which:

FIG. 1 is a schematic diagram showing a universal funds transfer and identification card exemplifying the present invention; and FIG. 2 is a schematic diagram illustrating an alternative form of universal funds transfer and identification card.

While the invention will be described in connection with certain preferred embodiments, it will be understood that there is no intent to limit it to those embodiments. On the contrary, the intent is to cover all alternatives, modifications and equivalents included within the spirit and scope of the invention as defined by the appended claims.

Turning now to the drawings, FIG. 1 shows the details of a card exemplifying the present invention. The card, generally indicated at 20, may be configured to physically resemble a common credit card, having the same length and width, but being slightly thicker. Alternatively, the card may be made to other convenient sizes, such as the size of an ordinary check register. The electronic components, to be described below, are encapsulated within or laminated between the structural elements of the card. For mating the card with a terminal in which it is to be used, connector means 22 are provided arranged along a single edge of the card so as to increase the attractiveness of the card and facilitate storage and handling thereof. Capture holes 21 are also provided for allowing the terminal to capture unauthorized cards, as is more fully described in connection with FIG. 2.

In accordance with the invention, random access memory means are provided having a plurality of data fields, selectively addressable, for carrying up to date account information, providing such information to a terminal for performing a transaction, and receiving updated information from the terminal to complete the transaction. In the FIG. 1 embodiment, such memory means is implemented by random access memory (RAM) 24 having data lines generally indicated at 25, address lines generally indicated at 26 and a read/write control line 27. As shown in the drawing, all of such lines are coupled to the connector means 22 providing, in the illustrated embodiment, four binary data connectors 27, eight binary address connectors 28, a read/write control connector 29 and an enable connector 30. As a result, the entire contents of the RAM 24 are readily accessible by a terminal, the terminal being adapted to actuate the RAM for operation via the enable connector 30, select any of the fields of data within the RAM via the address connectors 28, read data from the RAM via the data lines 27 if the control connector 29 is energized in the read mode and write data into the addressed field of the RAM via the data lines 27 if the control connector 29 is in the write mode. Because all, or substantially all of the contents of the RAM are available to the terminal, sufficient up to date data may be maintained on the card 21 so that the card is itself, an up to date record of the type and status of the account to which it relates.

Because the RAM 24 is a volatile semiconductor memory, means are provided on the card for preserving the data contained within the memory between terminal uses, shown herein as battery 31 for supplying "onboard" power to the card electronics. In normal operation, when the card 21 is inserted in a terminal with the contacts 22 mating the terminal, the terminal supplies power to the card via power contact 32 and ground contact 33. Such power is supplied through an isolating diode 34 and across a filter capacitor 35 to a voltage regulator 36. The voltage regulator 36 serves to produce at its output 37 a voltage of the proper magnitude for powering the remaining electronics. The battery 31, provided for maintaining the contents of the memory during non-terminal use, has a negative contact 39 coupled to circuit common and a positive contact 40 coupled through isolating diode 41 to the input of the voltage regulator 36. Alternatively, the battery may bypass the voltage regulator and be coupled through its isolating diode to the output 37 of the voltage regulator.

For recharging the battery 31 during terminal operation, a contact 43 is provided coupled through an isolating diode 44 to the positive contact 40 of the battery 31. A battery test contact 45 is also provided so that the voltage of the battery may be measured by the terminal to ascertain whether charging current should be provided through the charge contact 43.

According to a further feature of the invention, permanent memory means may be provided for storing non-changeable data, shown herein as read only memory (ROM) 50. It is seen that the ROM 50 has data outputs generally indicated at 51 coupled in parallel with the data outputs 24 of the RAM. Similarly, the ROM has address inputs 52 also coupled in parallel with the address inputs 26 of the RAM. The ROM has an enable input 54 connected to enable contact 55 of the connecting means functioning much as the enable contact 30 of the RAM for causing the memory to respond to the address lines. As a result, when the terminal requires data stored within permanent storage in the ROM, the terminal serves to activate the enable input 54 of the ROM 50 via the ROM enable contact 55, and to address via contacts 28 the proper location within the ROM, thereby to read the addressed data via the contacts 27. It is, therefore, apparent that the terminal may enable either the ROM 50 via enable contact 55 or the RAM 24 via enable contact 30 for reading the data addressed therein, and may further enable the RAM via enable contact 30 to write data thereinto.

In accordance with a further feature of the invention, means may be provided for displaying to the holder of the card the current account status, as such status is stored within the RAM 24. To that end, a readout switch 60 is provided coupled to a display 61 and a shift register 62 as shown. The shift register has three binary outputs coupled to address lines 1, 2 and 4 of the RAM for addressing certain of the fields within the RAM. Actuation of the readout switch 60 causes the shift register to clock through its binary states, thereby addressing successive words stored within the RAM 24. The words are read out via the lines 24 which, in turn, are coupled to the display 61, such display also including a display driver. As the display is actuated via depression of the readout switch 60, the words successively read out of the RAM 24 are caused to light associated lights on the display thereby to show the numbers stored within the addressed words in the RAM. The shift register is arranged so that the words in the RAM addressed by actuation of the readout switch 60 are those storing the current account balance. In addition, it may be desirable to read out the date of last update. As a result, the holder of the card may, at any time, determine the current account balance simply by operation of the switch 60 and viewing of the display 61.

Turning now to FIG. 2, there is shown an alternative embodiment of a universal funds transfer and identification card exemplifying the present invention. Such card, just as the card of FIG. 1 includes random access memory means selectively addressable for reading out and writing in account data so that the card is, itself, an up to date record of the type and status of the account.

The card 70 illustrated in FIG. 2 implements the random access memory via a matrix of magnetic cores 71 of the type typically used in computers arranged as a single plane core memory. Such cores may be selectively magnetized in a first or a second direction thereby to store a data 1 or a data 0 depending upon the direction of magnetization. A first axis of the matrix, the vertical axis, includes a plurality of individual vertical lines 72a, 72b etc., coupled between a common vertical bus 73 and respective vertical connectors 74a, 74b etc. and passing through the centers of the cores in the respective columns. The bus 73 is connected to a bus contact 75 positioned on the same edge of the card as the vertical contacts 74.

The horizontal axis of the matrix also includes a plurality of matrix lines 75a, 75b etc. emanating from a horizontal matrix bus 76 and passing through the centers of the cores in the respective rows. According to one aspect of this embodiment of the invention, the horizontal axis of the matrix is folded so that all of the connectors associated with the horizontal axis are located along the same edge of the card as the connectors for the vertical axis, localizing the entire connector means along a single edge 85 of the card 70. Accordingly, the line 75a, for example, after passing through all of the cores 71 in its associated row is doubled back along its horizontal path and then folded between the vertical lines 72y and 72z so as to terminate at a connector 77a positioned between the connectors 74y and 74z. Similarly, the line 75b is doubled back to the point between lines 72x and 72y and terminated in connector 77b positioned between connectors 74x and 74y. Alternatively, it is contemplated that the connectors coupled to the folded horizontal lines, rather than being interspersed between the connectors associated with the verticals, might be grouped in a separate area along the connector card edge 85. The horizontal axis bus 76 is also connected to a connector 78 on the connector edge 85 of the card. A sense line 79 is provided passing through all of the cores and coupled between connectors 80 and 81, also positioned on the connector edge 85 of the card. As a result of the folded core memory arrangement, all of the connectors are brought to a single connector edge of the card, thereby to facilitate storage of the card in a person's wallet or purse, and insertion of the card into a terminal.

It will be appreciated from the foregoing that each core in the matrix has three wires passing therethrough, a horizontal line, a vertical line and the sense line. After the cores and the matrix wires are arranged as shown, the assembly may be encapsulated thereby to provide a sturdy, easily storable and readily usable card. The card is preferably formed with capture holes 83, 84, engaged by the terminal into which the card is inserted so that the terminal may prevent withdrawal of the card, capturing it from the user in the event the terminal determines from the data stored on the card that the use thereof is unauthorized.

It will be appreciated from the foregoing that the card, when inserted into the terminal, provides the terminal with selective access to the various fields of data stored therein. With the single plane core memory, however, the terminal must access each of the cores individually, so that data to be read from or written into a selected field is transferred one bit at a time. Using the coincident current selection technique, well known to those familiar with magnetic memory planes, data is written into a selected core by simultaneously coupling current pulses to the vertical and horizontal intersecting the selected core. The summed currents cause the core at the intersection of the pulsed vertical and horizontal to be magnetized in a direction determined by the direction of current flow. In the write-in mode, the verticals and horizontals serve as both address and data lines. Readout of a selected core is similarly accomplished by simultaneously coupling current pulses to the vertical and horizontal intersecting the selected core while monitoring the sense line 79 to detect a signal indicating whether a zero or one had been stored in that core. Thus, in the readout mode, the vertical and horizontal serve as address lines while the sense line serves as a data line. As is well known, following this destructive readout, the readout circuitry is adapted to rewrite the data into the core if such data is to be retained.

In summary, writing of data into a field in the core memory plane is accomplished by sequentially coupling current pulses through selected cores in sequence via the vertical and horizontal conductors intersecting such cores. Similarly, readout is accomplished by pulsing selected cores while monitoring the sense line to detect the data stored in the pulsed core. It is apparent that the terminal accomplishes addressing by selecting the appropriate vertical and horizontal, intersecting at a selected core, and must provide storage for holding the data while it is sequentially read into or out of the memory one bit at a time.

The following is offered as a specific example of the manner in which a card according to the invention is programmed to function as a universal funds transfer and identification card. The field numbers assigned to the various types of account data may not, in all cases, bear a one-to-one correspondence to individually addressable fields within the memory. That is, certain of the account data fields may require a plurality of memory fields for storage of the necessary data while others may be stored in less than a complete memory field. However, the logic within the terminal will, at all times, know the address or addresses of the memory fields where the data for the desired account field is stored. In the example, the card may be programmed:

| Account Data Field Number | Account Data |
| --- | --- |
| Fixed Storage - to be initiated and altered only by the issuer of the card | |
| 1 | User name |
| 2 | User account number |
| 3 | Personal identification number (PIN) |
| 4 | Issue date |
| Semi-Fixed Storage - to be initiated and altered only by authorized terminals and operators | |
| 5 | User address |
| 6a-c | Bank identification numbers (up to three) |
| 7a-c | Bank account types (up to three) |
| 8 | Bank telephone number |
| 9 | Encryption code |
| 10 | Number of cards authorized for this user |
| 11 | Authorization types |
| | Limits on purchase |
| 12 | As % of card account balance |
| 13 | As overdraft amount (dollars only) |
| 14 | Number of PIN attempts before cancelling |
| Working Storage | |
| 15 | Account balance |
| 16 | Total amount of transactions since last update |
| 17 | Date of last update |
| 18 | Temporary identification (e.g. hotel room) |
| 19 | Scrambled PIN number and scramble code |

The foregoing data may be stored in its entirety in the RAM, or if a ROM is provided, at least the fixed storage information may be stored therein. Additionally, some of the semi-fixed storage may be converted to fixed storage so that it may permanently be written into the ROM. Digitized signature identification may be stored in an additional field for signature verification purposes.

It will be appreciated that considerable detailed account data is readily obtainable from the card, the terminal being adapted to produce signals for accessing any portion of the data required to perform and verify a given transaction. As a result, the card is truly universal, in that it may give only minimal data when needed for a simple transaction, or detailed account data when needed for a more complex transaction. Among the types of transactions contemplated for such a card are, in addition to the normal credit purchase, bank transactions such as deposits, withdrawals, etc., utility bill payments, check cashing, etc. In addition to this versatility, the card is reasonably secure from tampering, the internal memory being accessible only via the address lines, and the memory addresses of the various fields being known only to the compatible terminals.

As a further aid in understanding the invention, the following are offered as typical transactions which may be initiated and completed using a card according to the invention.

The first illustrative transaction is the simple transaction, typically for low value items, and requiring no verification. The user initiates the transaction by inserting the card in the terminal, the terminal being caused to read fields 2, 3, 6a, 11, 15 and 16. The user then selects the items desired while the terminal notes the amount of purchase. The terminal records the data from fields 2, 3, 6a and amount of purchase, for transfer to the bank identified in field 6a. The terminal then updates the numbers derived from fields 15 and 16 by the amount of purchase, and writes the new totals onto the card in fields 15 and 16. After the product is delivered, the user is allowed to remove the card, thereby terminating the transaction.

For transactions involving more than certain minimum dollar amounts, the terminal is programmed to require user verification. Such terminals are of the type including keyboards, typically comprised of ten keys (numbered 0 through 9), wherein the user is caused to punch a personal identification number using the keyboard, the punched-in number being compared to the PIN number stored in the card memory for verification. The PIN number is typically stored on the card in field 3 in fixed storage. However, in certain cases even greater security may be achieved by storing the PIN number in scrambled configuration in working storage, such as in field 19. In the latter case the digits of the PIN number are scrambled in an order determined by the terminal, and a scramble code inserted so that a subsequent terminal may unscramble the PIN number according to the code, for comparison with the punched-in personal identification number. A typical transaction is initiated by inserting the card in the terminal, the terminal engaging the capture holes for the balance of the transaction. The terminal then reads fields 2, 6a, 11, 15, 16, 17 and 19, and lights a light instructing the user to punch in his personal identification number. The terminal accepts the personal identification number as punched in by the user, and compares it to the number derived from field 19 unscrambled according to the scramble code. If the numbers do not match, the terminal may allow the user another chance to enter the PIN number. If the user is unsuccessful, an invalid card indicator will be lit, and the card may be either returned to the user or captured. If the PIN number is verified, the card is current (field 17), and the type of transaction is authorized (field 11), the user is allowed to select the desired items, the terminal causing the delivery thereof after assuring that the amount of the total transaction is less than the account balance. The terminal, as in a simple transaction causes the recording of the necessary data for later transmission to the bank of field 6a. Similarly, the terminal updates the account balance and total transaction amounts as derived from fields 15 and 16 respectively, and writes the new totals back into those fields. After the transaction is thus completed, the card is returned to the user.

In certain cases, it may be desirable to communicate with a central data base before completing a transaction. For example, in cases where the user desires to perform a transaction for an amount greater than the account balance, it may be necessary to access a bank to determine if the transaction is allowable. Initially, the terminal will use the information stored in fields 12, 13 and 14 to determine, from the information carried on the card itself, whether the overdraft amount is authorized. If it is, the transaction may be completed without accessing the central data base. If the overdraft amount exceeds the authorized limits, at the appropriate point in the program, the terminal will read from the card the bank telephone number stored in field 8, and seize a telephone line for dialing that number to access the bank. The terminal may then interact with the central data base at the bank to determine if the transaction should be allowed. For example, payments or other funds transfers, not yet recorded on the card, may be used to update the card balance (and date of last update) and thereby authorize the transaction.

As a final example, a simple but common transaction may involve updating the card by virtue of a payment made. The bank central data base is dialed by the terminal and the amount of payment previously made to the bank is transmitted to the terminal, such data being used to update the account balance as well as the date of latest update information stored on the card.

It should be noted that the word transaction is used herein in its broad sense to include any interaction between a card and terminal, and is not limited to the financial transactions described in connection with the preferred embodiment. For example, the word transaction may include use of the card in terminals arranged to control security systems or reservations systems.

It will therefore be apparent that what has been provided is a universal funds transfer and identification card which is, itself, an up to date record of the type and status of the account with which it is associated. Because of the amount of up to date information stored on the card itself, for example the account balance, transaction amount since last update and date of last update, the amount of communication necessary with a central data base when performing a typical transaction is greatly reduced. Further, the number of types of transactions performable by a remote terminal are greatly increased, with resulting convenience to both the user and the central banking systems.

I claim as my invention:

1. In a universal funds transfer and identification card for use with electronic terminals adapted to perform transactions and produce signals for carrying out and recording said transactions, the improvement comprising, random access memory means in said card for storing information including the following changeable information:

account balance, total amount of transactions since last update of card, and date of last update; connecting means along a single edge of said card adapted to mate said terminal for coupling signals between said card and said terminal, and means coupling said connecting means to said random access memory means for selectively addressing fields within said memory means and transferring data between addressed fields and said terminal, whereby said card serves as an up to date record of said account.

2. The improvement as set forth in claim 1 wherein said memory means is a single plane core memory having a plurality of magnetic cores arranged in a rectangular matrix, first line means forming a first axis of said matrix and comprising a plurality of wires defining the respective lines of said first axis and passing through the cores in said lines, second line means forming a second axis of said matrix and comprising a plurality of wires defining the respective lines of said second axis and passing through the cores in said lines, and sense line means passing through all of said cores, said connecting means being located along one edge of said card generally perpendicular to said first axis with the wires of said first axis connected directly to said connecting means, the wires of the second axis of said matrix being folded parallel to said first axis so that said wires in said second axis are connected to said connecting means, said sense line means being connected to said connecting means, whereby the connecting means are localized along a single edge of said card.

3. The improvement as set forth in claim 1 wherein said random access memory means is a semiconductor random access memory. said card further including battery means coupled to said semiconductor memory for preserving the information stored in said random access memory means.

4. In a universal funds transfer and identification card for use with electronic terminals adapted to perform transactions and produce signals for carrying out and recording said transactions, the improvement comprising, random access memory means in said card having a plurality of fields for storing changeable information, connector means adapted to mate said terminal for coupling signals between said card and terminal, address lines on the card coupled between said connecting means and said random access memory means for coupling signals from said terminal for selectively addressing the fields of said memory means for access by said terminal, data lines on the card coupled between the connecting means and the memory means for transferring data between addressed fields and said terminal, and control line means on the card coupled between said connecting means and said memory means for carrying signals from said terminal for activating said memory means for reading from the addressed field of the memory means to said terminal or writing from said terminal to the addressed field of said memory means, whereby said card is adapted to transfer stored information to said terminal for performing a transaction and receive from said terminal updated information following said transaction.

5. The improvement as set forth in claim 4 wherein said random access memory means is a semiconductor random access memory, said card further including battery means coupled to said semiconductor memory for preserving the information stored in said random access memory means.

6. The improvement as set forth in claim 5 wherein the card further includes read only memory means for storing permanent data.

7. The improvement as set forth in claim 6 wherein the read only memory means is coupled to said address lines and data lines, and including enable line means coupling said connecting means with said random access memory means and said read only memory means for selectively actuating said memories for transfer of information with said terminal.

8. The improvement as set forth in claim 4 wherein said connecting means further includes a charging line for supplying charging current to said battery means from said terminal for recharging the battery during a transaction.

9. The improvement as set forth in claim 4 wherein said card further includes display means coupled to said random access memory and means for activating the display to show the stored account balance on command.

10. The improvement as set forth in claim 4 wherein the terminal is of the type including keys operated by a user for keying in a personal identification number, said changeable information stored on said card including a personal identification number for comparison by the terminal with said keyed number.

11. The improvement as set forth in claim 10 wherein the personal identification number is stored in said memory means in conjunction with a scramble code, said terminal being adapted to unscramble the personal identification number in accordance with the scramble code for comparison with the keyed number.

12. The improvement as set forth in claim 4 wherein the connecting means further includes power line means for supplying power to said card from said terminal during a transaction.

13. In a universal funds transfer and identification card for use with electronic terminals adapted to perform transactions and produce signals for carrying out and recording said transactions, the improvement comprising, random access memory means in said card having a plurality of fields for storing changeable information, said memory means comprising a single plane core memory having a plurality of magnetic cores arranged in a rectangular matrix, first line means forming a first axis of said matrix and comprising a plurality of wires defining the respective lines of said first axis and passing through the cores in said lines, second line means forming a second axis of said matrix and comprising a plurality of wires defining the respective lines of said second axis and passing through the cores in said lines, and sense line means passing through all of said cores, connecting means located along a single edge of said card generally perpendicular to said first axis with the wires of said first axis connected directly to said connecting means, the wires of the second axis of said matrix being folded parallel to said first axis so that said wires in said second axis are connected to said connecting means, said sense line means being connected to said connecting means, said first line means, second line means and sense line means serving to transfer information between said terminal and fields in said memory means addressed by said terminal, whereby said card is adapted to transfer stored information to said terminal for performing a transaction and receive from said terminal updated information for storage.

* * * * *

REEXAMINATION CERTIFICATE (964th)
United States Patent [19]

Schatz

[11] B1 4,001,550

[45] Certificate Issued  Dec. 13, 1988

[54] UNIVERSAL FUNDS TRANSFER AND IDENTIFICATION CARD

[76] Inventor: Vernon L. Schatz, 250 Sunset Ridge Rd., Northfield, Ill. 60093

Reexamination Request:
No. 90/001,257, Jun. 15, 1987

Reexamination Certificate for:
| | |
|---|---|
| Patent No.: | 4,001,550 |
| Issued: | Jan. 4, 1977 |
| Appl. No.: | 637,712 |
| Filed: | Dec. 4, 1975 |

[51] Int. Cl.⁴ .................. G06F 15/30; G06K 19/00; G06K 19/06; G11C 17/02
[52] U.S. Cl. .................. 235/379; 235/487; 235/492; 365/98; 902/4; 902/26
[58] Field of Search .................. 235/492, 493, 489

[56] References Cited

U.S. PATENT DOCUMENTS

| | | | |
|---|---|---|---|
| 3,142,823 | 7/1964 | Lewin et al. | 235/489 X |
| 3,544,769 | 12/1970 | Hedin | |
| 3,559,175 | 1/1971 | Pomeroy | |
| 3,604,900 | 9/1971 | Kalt | |
| 3,637,994 | 1/1972 | Ellingboe | |
| 3,641,498 | 2/1972 | Hedin | |
| 3,702,464 | 11/1972 | Castrucci | |
| 3,806,874 | 4/1974 | Ehrat | |
| 3,806,882 | 4/1974 | Clarke | |
| 3,848,229 | 11/1974 | Perron et al. | |
| 3,852,800 | 12/1974 | Ohwada et al. | |
| 3,859,634 | 1/1975 | Perron et al. | |
| 3,868,057 | 2/1975 | Chavez | 235/492 X |
| 3,876,865 | 4/1975 | Bliss | 235/492 X |
| 3,906,460 | 9/1975 | Halpern | |
| 3,934,122 | 1/1976 | Riccitelli | 235/492 X |
| 3,940,747 | 2/1976 | Kuo et al. | |
| 3,971,916 | 7/1976 | Moreno | |
| 3,982,103 | 9/1976 | Goldman | |
| 4,007,355 | 2/1977 | Moreno | |
| 4,019,174 | 4/1977 | Vanderpool et al. | |
| 4,055,746 | 10/1977 | Peterson | 235/493 X |

FOREIGN PATENT DOCUMENTS

851357  9/1970  Canada.

OTHER PUBLICATIONS

"An Introduction to Microcomputers", Adam Osborne & Assoc., Inc.; SYBEX, 1975; pp. 3-1, 3-2.
"The TTL Data Book For Design Engineers, First Ed.", Texas Instruments; 1973; pp. 30, 190, 191, 220, 221, 351, 354, 356, 357, 463, 464, 466, 467, 470.
"Designing With Intel PROMS & ROMS"; Green & House; Intel Corp. 1975; p. 1.
"Motorola Semiconductors"; Motorola, Inc., 1975; pp. 1-3, 1-5.
"8080 Microcomputor Systems User's Manual"; Intel. Corp., Sep. 1975; Table of Contents.
"Structure et fonctionnement des ordinateurs"; Meinadier; Sciences Humaines et Sociales Series Informatique; Librairie Larousse; 1971; pp. 106-113.

*Primary Examiner*—David L. Trafton

[57] ABSTRACT

A universal funds transfer and identification card for use with electronic terminals, such card including a random access memory for storing up to date account information sufficient to allow the completion of at least certain transactions without the intervention of a remote computer. The card includes a plurality of storage fields, selectively addressable for storing changeable information including account balance, total amount of transactions since last update of balance, and date of last update. The information necessary for authorizing and completing a transaction is addressed by a universal terminal for transfer to the terminal from the card. The terminal is adapted to determine the credit status of the account from the information contained on the card, perform the transaction if allowed, and update the information on the card so that the card is, itself, a record of the type and status of the account.

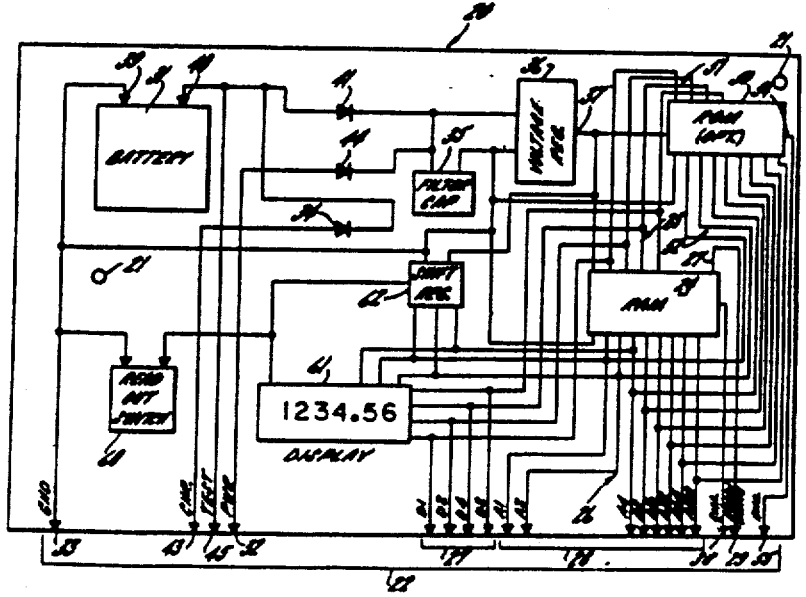

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2, 3 and 5–12, dependent on an amended claim, are determined to be patentable.

New claims 14–17 are added and determined to be patentable.

1. In a universal funds transfer and identification card for use with electronic terminals adapted to perform transactions and produce signals for carrying out and recording said transactions, the improvement comprising, random access memory means in said card for storing information including the following changeable information:
   account balance,
   total amount of transactions since last update of card, and date of last update; connecting means along a single edge of said card adapted to mate said terminal for coupling signals between said card and said terminal, and *selecting* means [coupling said connecting means to said random access memory means] for selectively addressing fields within said memory means, *said selecting means being coupled between said connecting means and said random access memory means*, and means for transferring data between addressed fields and said terminal, whereby said card serves as an up to date record of said account.

4. In a universal funds transfer and identification card for use with electronic terminals adapted to perform transactions and produce signals for carrying out and recording said transactions, the improvement comprising random access memory means in said card having a plurality of fields for storing changeable information, connector means adapted to mate said terminal for coupling signals between said card and terminal, address lines on the card coupled between said connecting means and said random access memory means for coupling signals from said terminal for selectively addressing the fields of said memory means for access by said terminal, data lines on the card coupled between the connecting means and the memory means for transferring data between addressed fields and said terminal, [and] control line means on the card coupled between said connecting means and said memory means for carrying signals from said terminal for activating said memory means for reading from the addressed field of the memory means to said terminal or writing from said terminal to the addressed field of said memory means, whereby said card is adapted to transfer stored information to said terminal for performing a transaction and receive from said terminal updated information following said transaction, *and selecting means on said card for selectively addressing fields within said memory means, said selecting means being coupled between said connecting means and said random access memory means.*

*14. In a universal funds transfer and identification card for use with electronic terminals adapted to perform transactions and produce signals for carrying out and recording said transactions, said terminals including keys operated by a user for keying in a personal identification number, the improvement comprising random access memory means in said card having a plurality of fields for storing changeable information including said personal identification number in conjunction with a scramble code, connector means adapted to mate said terminal for coupling signals between said card and said terminal, address lines on the card coupled between said connecting means and said random access memory means for coupling signals from said terminal for selectively addressing the fields of said memory means for access by said terminal, data lines on the card coupled between the connecting means and the memory means for transferring data between addressed fields and said terminal, and control line means on the card coupled between said connecting means and said memory means for carrying signals from said terminal for activating said memory means for reading from the addressed field of the memory means to said terminal or writing from said terminal to the addressed field of said memory means, whereby said card is adapted to transfer stored information, including said personal identification number and scramble code, to said terminal for performing a transaction, including a comparison of said personal identification number with a number keyed into the terminal by the user, and whereby said card is further adapted to receive from said terminal updated information following said transaction.*

*15. The improvement as set forth in claim 1, wherein said selective addressing means comprises a shift register that can be manually activated.*

*16. In a universal funds transfer and identification card for use with electronic terminals adapted to perform transactions and produce signals for carrying out and recording said transactions, the improvement comprising random access memory means in said card having a plurality of fields for storing changeable information, connector means adapted to mate said terminal for coupling signals between said card and terminal, address lines on the card coupled between said connecting means and said random access memory means for coupling signals from said terminal for selectively addressing the fields of said memory means for access by said terminal, data lines on the card coupled between the connecting means and the memory means for transferring data between addressed fields and said terminal, and control line means on the card coupled between said connecting means and said memory means for carrying signals from said terminal for activating said memory means for reading from the addressed field of the memory means to said terminal or writing from said terminal to the addressed field of said memory means, whereby said card is adapted to transfer stored information to said terminal for performing a transaction and receive from said terminal updated information following said transaction, display means coupled to said random access memory, and means for activating the display to show the stored account balance on command.*

*17. In a universal funds transfer and identification card for use with electronic terminals adapted to perform trans-* actions and produce signals for carrying out and recording said transactions, the improvement comprising random access memory means in said card having a plurality of fields for storing changeable information, connector means adapted to mate said terminal for coupling signals between said card and terminal, address lines on the card coupled between said connecting means and said random access memory means for coupling signals from said terminal for selectively addressing the fields of said memory means for access by said terminal, data lines on the card coupled between the connecting means and the memory means for transferring data between addressed fields and said terminal, and control line means on the card coupled between said connecting means and said memory means for carrying signals from said terminal for activating said memory means for reading from the addressed field of the memory means to said terminal or writing from said terminal to the addressed field of said memory means, whereby said card is adapted to transfer stored information to said terminal for performing a transaction and receive from said terminal updated information following said transaction, wherein the terminal is of the type including keys operated by a user for keying in a personal identification number, said changeable information stored on said card including a personal identification number for comparison by the terminal with said keyed number, said personal identification number being stored in said memory means in conjunction with a scramble code, said terminal being adapted to unscramble the personal identification number in accordance with the scramble code for comparison with the keyed number.

* * * * *